(12) United States Patent
Lindmeyer

(10) Patent No.: US 8,099,937 B2
(45) Date of Patent: Jan. 24, 2012

(54) REPLACEABLE EDGE FOR CUTTING BLADES

(75) Inventor: James Lindmeyer, Hutchinson, MN (US)

(73) Assignee: New Edge LLC, Hutchinson, MN (US)

( * ) Notice: Subject to any disclaimer, the term of this patent is extended or adjusted under 35 U.S.C. 154(b) by 21 days.

(21) Appl. No.: 12/404,707

(22) Filed: Mar. 16, 2009

(65) Prior Publication Data

US 2009/0229235 A1    Sep. 17, 2009

Related U.S. Application Data

(60) Provisional application No. 61/085,251, filed on Jul. 31, 2008, provisional application No. 61/036,629, filed on Mar. 14, 2008.

(51) Int. Cl.
*A01D 34/52* (2006.01)

(52) U.S. Cl. .................... 56/295; 56/255; 56/DIG. 20

(58) Field of Classification Search .................. 56/17.5, 56/255, 295, DIG. 19, DIG. 20
See application file for complete search history.

(56) References Cited

U.S. PATENT DOCUMENTS

| | | | |
|---|---|---|---|
| 2,869,311 A * | 1/1959 | Beeston, Jr. ................ 56/295 |
| 3,097,468 A * | 7/1963 | Johnson .................... 56/295 |
| 3,184,907 A * | 5/1965 | Harloff ..................... 56/295 |
| 3,388,540 A * | 6/1968 | Michaud ................... 56/295 |
| 3,665,692 A | 5/1972 | Hughes | |
| 3,683,606 A * | 8/1972 | Staines ..................... 56/295 |
| 3,738,092 A * | 6/1973 | Spear ....................... 56/12.1 |
| 3,742,688 A * | 7/1973 | Tonjes, Jr. ................. 56/193 |
| 3,918,242 A * | 11/1975 | Harris ...................... 56/16.7 |
| 4,375,148 A | 3/1983 | Beck | |
| 4,445,315 A | 5/1984 | Roszkowski | |
| 4,611,460 A | 9/1986 | Parker | |
| 4,651,510 A | 3/1987 | Malutich | |
| 4,750,320 A | 6/1988 | Liebl | |
| 4,779,407 A | 10/1988 | Pattee | |
| 5,018,347 A * | 5/1991 | Feilen ...................... 56/295 |
| 5,019,113 A | 5/1991 | Burnell | |
| 5,036,654 A * | 8/1991 | Malutich ................... 56/255 |
| 5,233,820 A | 8/1993 | Willsie | |
| 5,303,535 A | 4/1994 | Smith | |
| 5,383,329 A | 1/1995 | Cornell, III et al. | |
| 5,438,819 A | 8/1995 | Dallman | |
| 5,467,586 A | 11/1995 | Lin et al. | |
| 5,791,131 A * | 8/1998 | Hill et al. ................. 56/295 |
| 6,182,430 B1 | 2/2001 | Blarek et al. | |
| 6,935,095 B1 | 8/2005 | Sluder | |
| 7,299,612 B2 * | 11/2007 | Schuyler ................... 56/255 |
| 2003/0182918 A1 | 10/2003 | Stone et al. | |
| 2003/0209000 A1* | 11/2003 | Mannon et al. ............. 56/295 |
| 2007/0163124 A1 | 7/2007 | Kenny | |

* cited by examiner

*Primary Examiner* — Thomas Will
*Assistant Examiner* — Mai Nguyen
(74) *Attorney, Agent, or Firm* — Haugen Law Firm PLLP

(57) ABSTRACT

A cutting blade apparatus includes a blade and a replaceable cutting edge component that is removably engageable with the blade. The cutting blade apparatus may be used in a variety of cutting applications, and in some embodiments may be useful in rotary lawn mower applications. The replaceable cutting edge components may present a profile useful in vegetation mowing and mulching applications. The cutting blade apparatus of the present invention facilitates the maintenance of high-quality cutting edges without the need to disassemble the blade from its mounting.

3 Claims, 7 Drawing Sheets

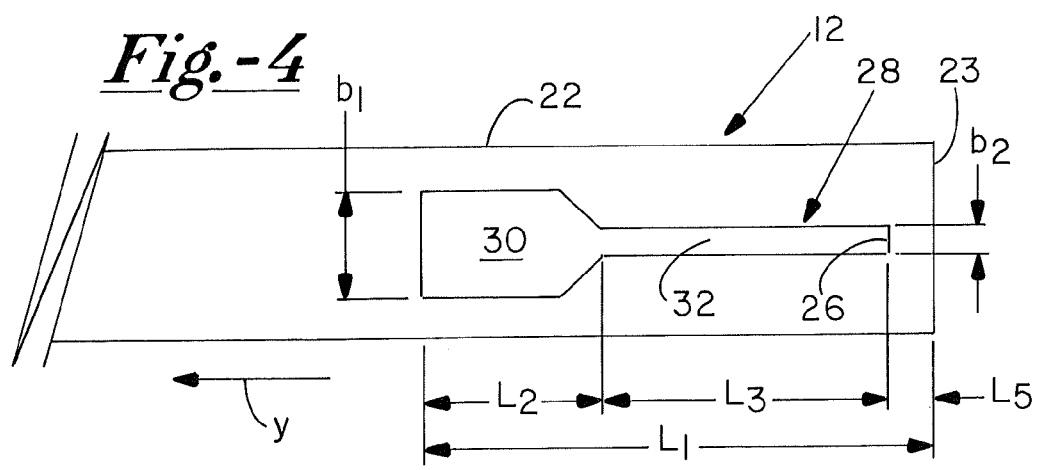
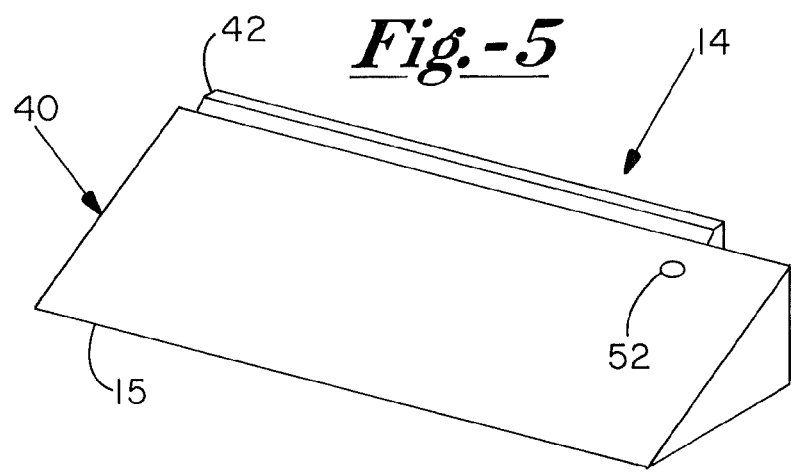
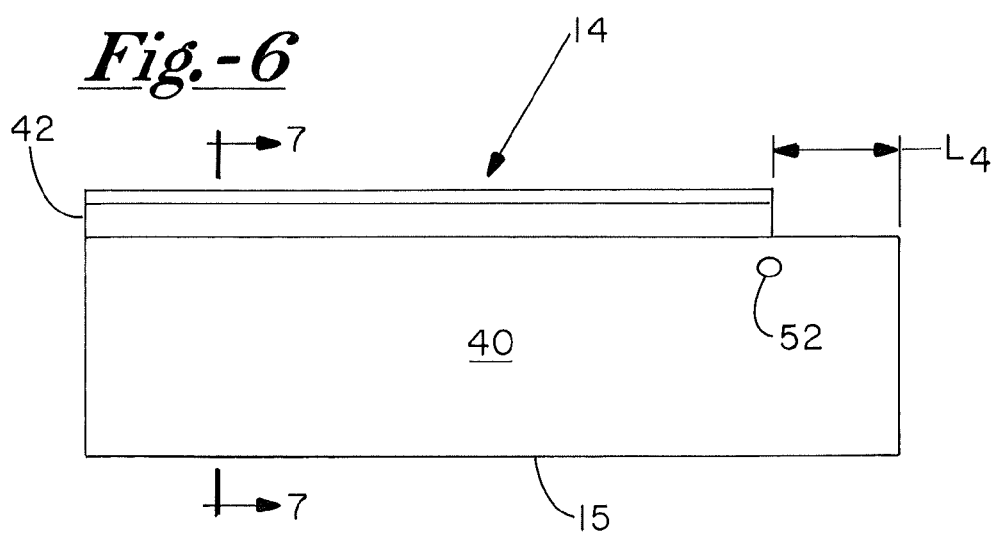

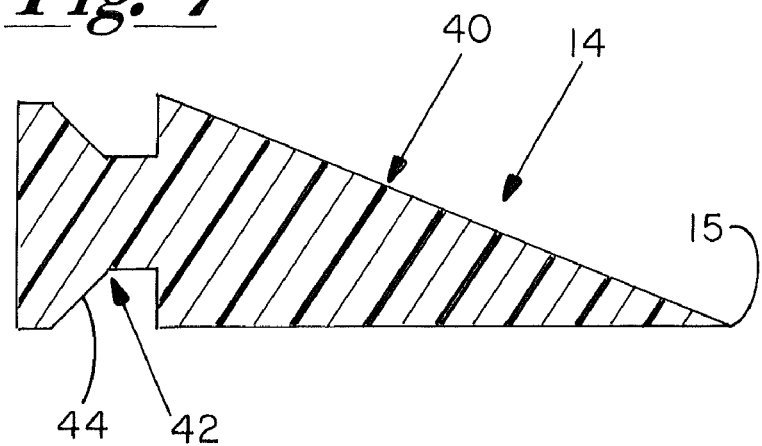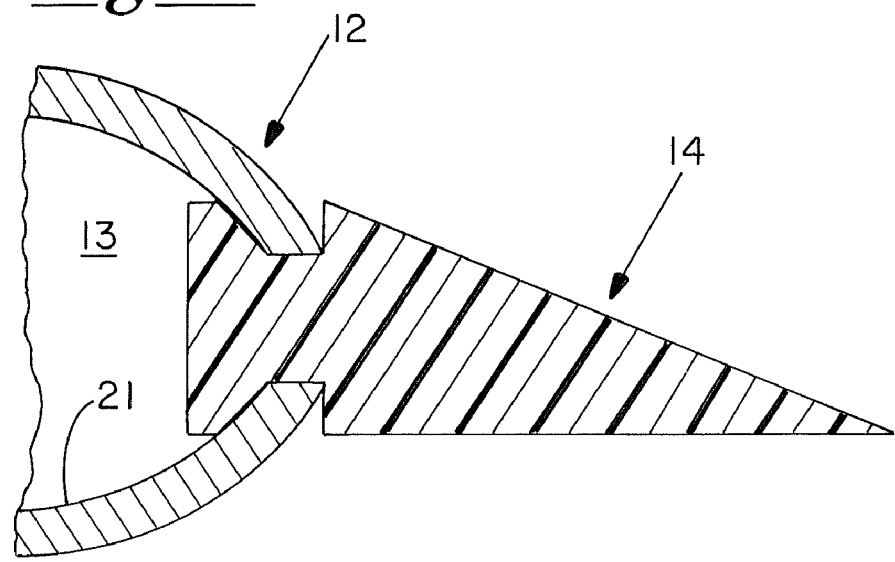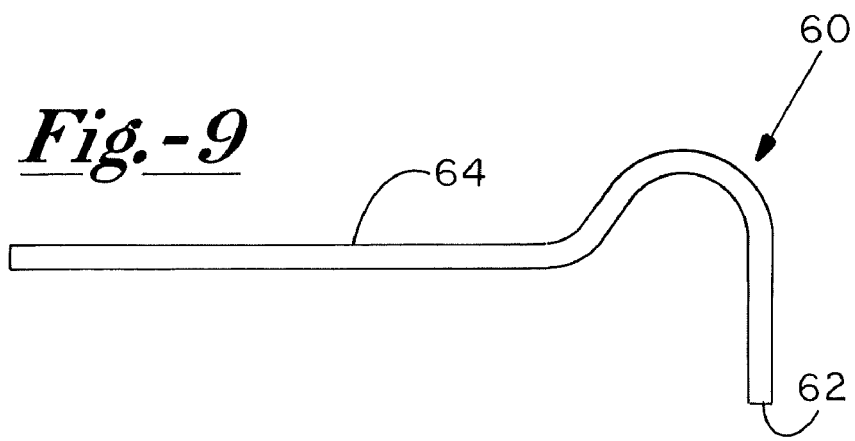

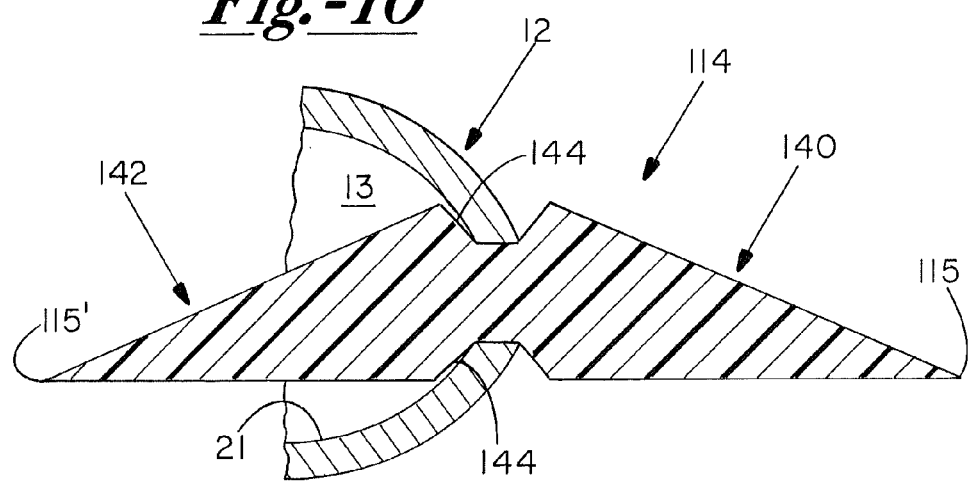
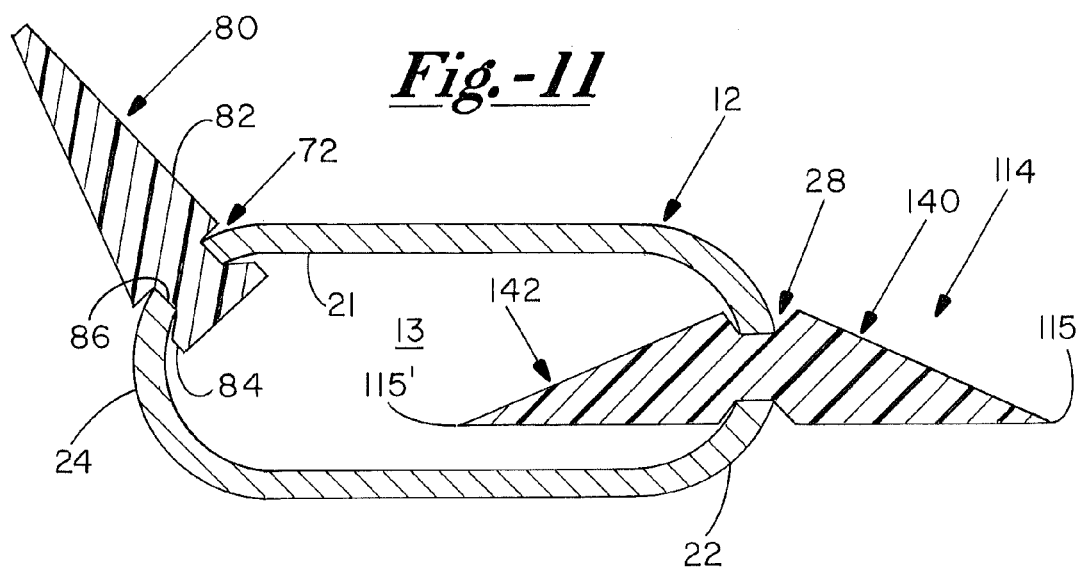

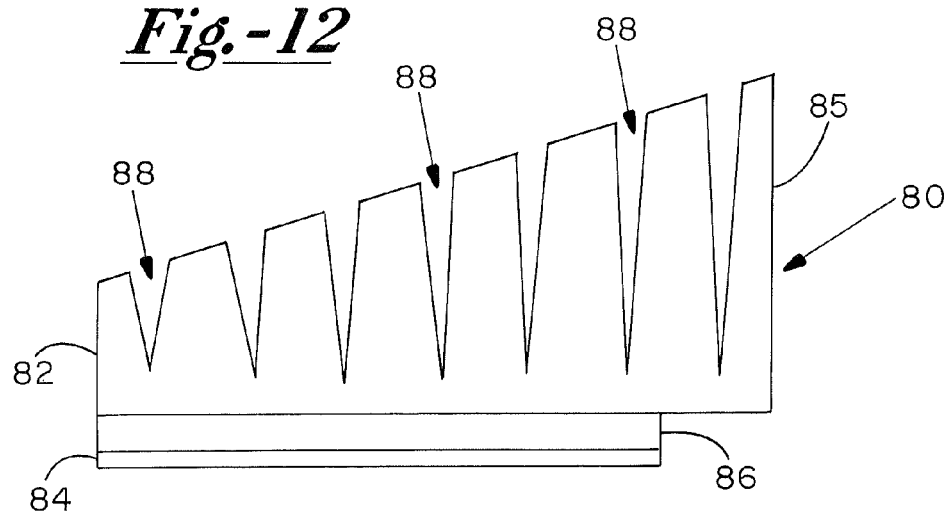
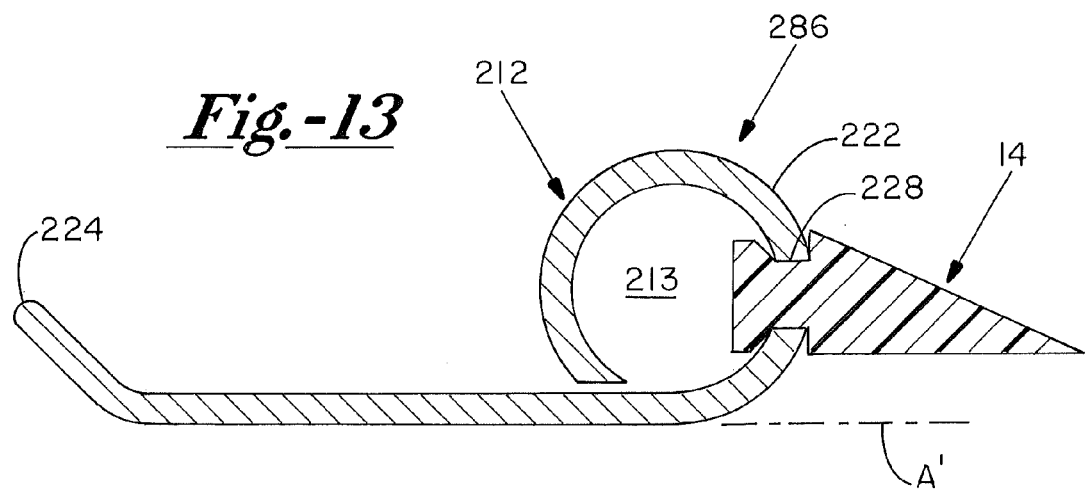

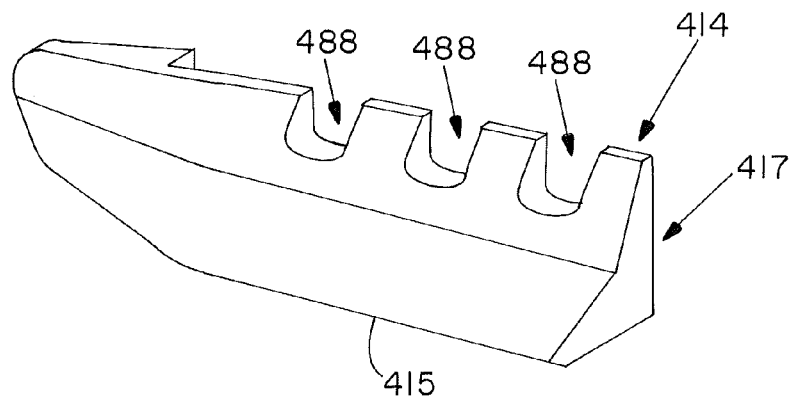
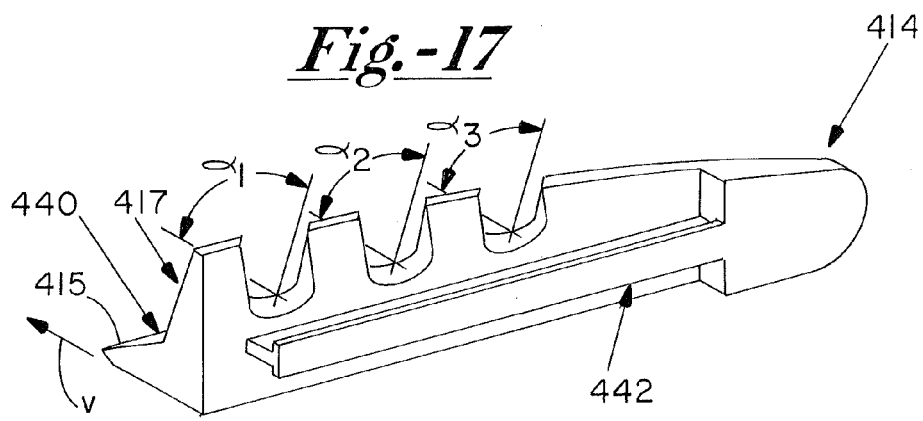
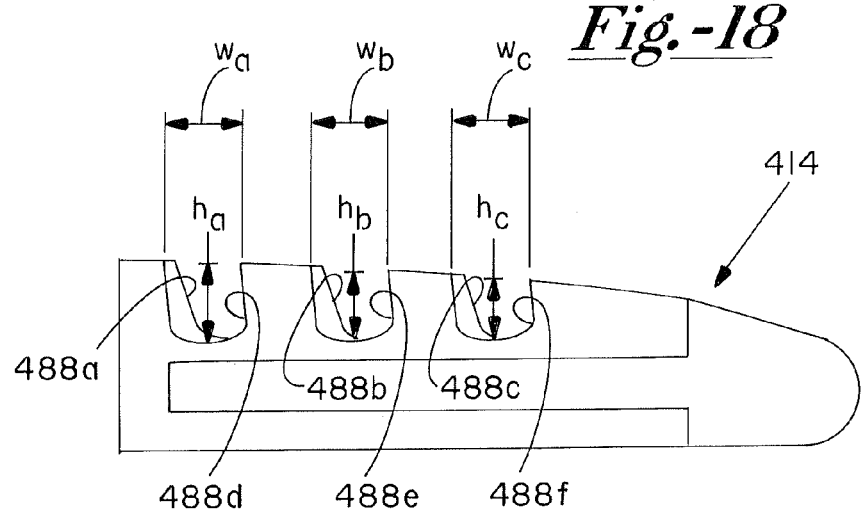

REPLACEABLE EDGE FOR CUTTING BLADES

CROSS REFERENCE TO RELATED APPLICATIONS

This application claims priority to U.S. Provisional Patent Application Ser. No. 61/085,251, filed on Jul. 31, 2008 and entitled "Replaceable Edge for Mower Blades", and also claims priority to U.S. Provisional Patent Application Ser. No. 61/036,629, filed on Mar. 14, 2008 and entitled "Replaceable Edge of Mower Blade", the contents of which being incorporated herein in their entirety.

FIELD OF THE INVENTION

The present invention relates to cutting blades generally, and more particularly to a cutting blade apparatus having replaceable cutting edge elements which are removably engageable with a blade body. The replaceable cutting edge components may optionally be indexable so as to each provide multiple cutting edges that may be selectively placed in an operating orientation by the user.

BACKGROUND OF THE INVENTION

A common problem with conventional cutting blades is the loss of sharpness or damage to the cutting edges of the blades encountered through use. Dulled or damaged cutting blade edges are less efficient in cutting through materials such as vegetation, and consequently place greater strain on the propulsion system driving the blade, and can even cause damage to the vegetation through the breaking instead of cutting of the individual stems. Conventional cutting blades must therefore be periodically replaced or reconditioned, both of which require the time-consuming process of removing and re-installing the entire blade. Either of replacing or reconditioning of the blade can be expensive particularly when multiplied by the number of times such process is needed over the lifetime of the cutting device.

A solution to the problems identified above is to provide cutting blades with replacement cutting edges. A number of designs for such replaceable cutting edges have been previously developed. However, the replacement cutting edge systems proposed to date have substantial drawbacks. For example, conventional replacement cutting edge systems provide only a single cutting edge, thus requiring replacement of the edge component whenever damage or dullness occurs. Moreover, conventional replacement cutting edge systems are configured for use in connection with a solid cutting blade design, which can be relatively expensive to produce.

In one embodiment, conventional rotary mower blades typically involve an external profile which, upon rotary motion at operating speeds, creates a lifting force at the ground surface. Such lifting force urges grass blades into an upright orientation so that the mower blade is more effective in cutting the grass, and cutting the grass evenly. The profile to enable such a lifting force typically includes an upwardly-inclined portion of the trailing edge of the blade opposite the leading cutting edge portion of the blade. Mulching mower blades use similar geometries, albeit with cutting recesses formed in the upwardly-inclined "lift" portion of the mower blade. The positioning of the "lift" portion, as well as the mulching portion, at the trailing edge of conventional lawn mower blades can result in a loss of lifting force in the time interval between a first "lifting" pass of the mower blade and a second "cutting" pass of the mower blade. In such circumstances, cutting and/or mulching performance may be compromised.

It is therefore a principal object of the present invention to provide a cutting blade apparatus having replaceable cutting edge components which engage at a leading edge of a hollow or tubular portion of the cutting blade.

It is a further object of the present invention to provide a cutting blade apparatus having replaceable cutting edge components which each include a plurality of cutting edges selectively indexable into an operating orientation.

It is another object of the present invention to provide a cutting blade apparatus having a replaceable cutting edge component which integrates a "lift" profile therewith.

It is yet another object of the present invention to provide a cutting blade apparatus having a replaceable cutting edge component which integrates a "lift" and a mulching profile therewith.

SUMMARY OF THE INVENTION

By means of the present invention, cutting blades, such as those utilized in mechanized systems may, be provided with easily serviceable and/or disposable cutting edges. The cutting edges may be fabricated from a polymeric material that is recyclable. In such a manner, the edges of cutting blades may be efficiently replaced without needing to remove and repair the entire cutting blade, which therefore saves significant time and expense in the operation of cutting blades.

The cutting blade apparatus of the present invention may also provide a profile which acts to generate lifting forces along a direction perpendicular to the plane of travel of the blade. In one example, the cutting blade apparatus of the present invention may be utilized in a rotary mower, wherein the replaceable cutting edge components generate a lifting force perpendicularly upwardly with respect to the horizontal plane of travel defined by the operating rotary blade. In still further embodiments, the replaceable cutting edge component of the present invention may further provide a mulching profile, which acts to mulch vegetation clippings cut by the cutting blade apparatus of the present invention.

In one embodiment, the cutting apparatus of the present invention may be incorporated in a motorized application, wherein the apparatus includes a blade having a tubular portion and a replaceable cutting edge component. The replaceable cutting edge component includes a first portion having a first cutting edge, and a second portion that is removably engageable with the tubular portion of the blade so as to operably orient the cutting edge for cutting upon propulsion of the blade.

In another embodiment, the cutting blade apparatus includes a blade having a leading edge with a leading surface and a trailing surface, and a slot providing an opening from the leading surface to the trailing surface. The apparatus further includes a replaceable cutting edge component having a first portion including a cutting edge, and a second portion that is removably engageable through the slot to operably retain the first portion of the cutting edge component in proximity to the leading surface of the blade, and a second portion in contact with the trailing surface of the blade.

In a still further embodiment, the cutting blade apparatus of the present invention may be adapted for cutting target materials substantially along a cutting plane, wherein the apparatus includes a blade having first and second end portions separated by a central portion. The apparatus further includes a replaceable cutting edge component removably engageable with at least one of the first and second end portions, and having a first portion and a second portion. The first portion of the replaceable cutting edge component includes a cutting portion defining a cutting edge and having a first surface extending from the cutting edge to an intersection zone along a first plane that is upwardly angled by a first angle with respect to the cutting plane. The first portion of the replaceable cutting edge component further includes a lift portion having a second surface extending from the intersection zone to a top edge along a second plane that is upwardly angled by a second angle with respect to the cutting plane.

BRIEF DESCRIPTION OF THE DRAWINGS

FIG. 4 is an enlarged side elevational view of a portion of the cutting blade apparatus illustrated in FIGS. 1-3;

FIG. 5 is a perspective view of a cutting edge component of the present invention;

FIG. 6 is a top plan view of the cutting edge component illustrated in FIG. 5;

FIG. 7 is a cross-sectional side elevation view of the cutting edge component illustrated in FIGS. 5 and 6;

FIG. 8 is a cross-sectional side view of a portion of the cutting blade apparatus illustrated in FIG. 1;

FIG. 9 is a side elevational view of a removal tool for use in connection with the cutting blade apparatus of the present invention;

FIG. 10 is a cross-sectional side view of the cutting blade apparatus of the present invention;

FIG. 11 is a cross-sectional side view of a cutting blade apparatus of the present invention;

FIG. 12 is a plan view of an accessory component of the cutting blade apparatus of the present invention;

FIG. 13 is a cross-sectional side elevational view of the cutting blade apparatus of the present invention;

FIG. 16 is a front perspective view of a cutting edge component of the cutting blade apparatus of the present invention;

FIG. 17 is a rear perspective view of the cutting edge component illustrated in FIG. 16; and FIG. 18 is a rear elevational view of the cutting edge component illustrated in FIGS. 16 and 17.

DETAILED DESCRIPTION OF THE PREFERRED EMBODIMENTS

Figure 1:
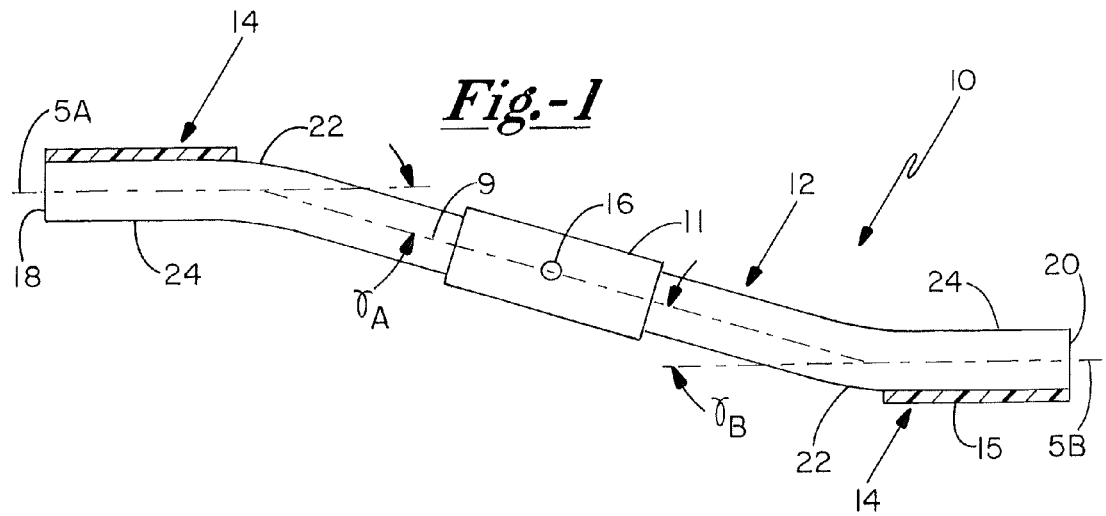
FIG. 1 is a top plan view of a cutting blade apparatus of the present invention.

Example embodiments of a cutting blade apparatus of the present invention will now be described with reference to the drawing figures. It is to be understood, however, that various modifications to the illustrated embodiments may be made that are within the scope of the invention. With reference to FIG. 1, a cutting blade apparatus 10 includes a blade 12 and replaceable cutting edge components 14 removably secured to blade 12 at respective cutting portions 18, 20. An aperture 16 is provided in blade 12, and preferably at a radial center thereof, for attachment to a drive spindle (not shown) in conventional fashion.

Figure 2:
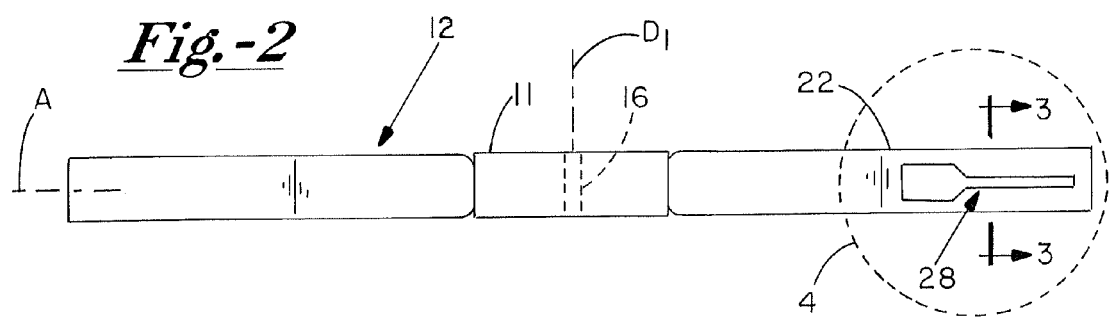
FIG. 2 is a side elevational view of the cutting blade apparatus illustrated in FIG. 1.

A side view of blade 12 is illustrated in FIG. 2, wherein leading edge 22 of blade 12 includes a slot 28 formed therein.

Figure 3:
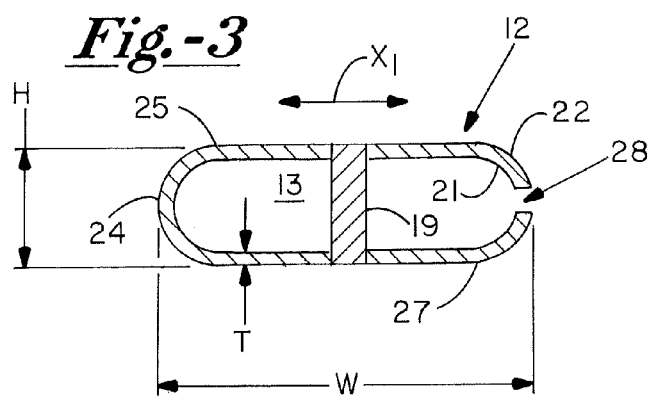
FIG. 3 is a cross-sectional end view of the cutting blade apparatus illustrated in FIGS. 1 and 2.

With further reference to FIGS. 2 and 3, blade 12 may be at least partially hollow, and in the illustrated embodiment is substantially tubular. In some embodiments, blade 12 may have a width "W" to height "H" ratio of between about 1.5:1 to 8:1. A variety of width and height dimensions may be utilized in blade 12, depending upon the desired application of mower blade apparatus 10. In some embodiments, width dimension "W" may be between about 0.5 and about 4 inches, and height dimension "H" may be between about 0.25 and about 1 inch. Various modifications of the configuration of blade 12 illustrated in FIG. 3, however, are contemplated as being useful in the mower blade apparatus of the present invention.

Blade 12 may be substantially tubular with a wall thickness dimension "t" of between about 0.075 and about 0.375 inch, and may be press-formed into a desired width to height ratio from an original, substantially circular cross-section configuration. Blade 12 may be formed of any of a variety of strong and durable materials known as being useful in lawn mower blades. For example, blade 12 may be fabricated from powder-coated carbon steel, anodized nickel steel, and the like. Other materials, however, such as metals, metal alloys, and polymers may instead or additionally be utilized in the fabrication of blade 12.

It is desired that at least a portion of blade 12 be hollow so as to define an interior space 13. Applicant has determined that a hollow and/or at least partially tubular arrangement for blade 12 enhances to the overall strength of blade 12, particularly along the horizontal axis "$X_1$". In fact, blade 12 in the configuration of the present invention is sufficiently strong along axis $X_1$ so that heat treatment of the steel material may not be required. Conventional cutting blades may typically me solid steel construction, and require heat treatment in order to be strengthened to the point of being useful in, for example, vegetation mowing applications. By contrast, the at least partially hollow blade arrangements of the present invention may provide adequate strength for such applications even without heat treatment subsequent to formation. As a result, significant cost savings may be realized in the production of the mower blades of the present invention.

An embodiment of blade 12 having an at least partially tubular configuration may be fabricated from electric resistance weld (ERW) steel tubing.

In some embodiments, blade 12 may be substantially "s"-shaped, as illustrated in the top view of FIG. 1, with first and second cutting portions 18, 20 being skewed relative to a major axis 9 of blade 12 Respective axis 5A, 5B of first and second cutting portions 18, 20 may be angularly offset from major axis 9, with such offset presenting access by cutting edge components 14 to slot 28. The angular offset $\gamma_A$, $\gamma_B$ of axes 5A, 5B from major axis 9 of blade 12 may be between about 10° and about 30°, and, in one embodiment may be about 16°. In other embodiments, however, blade 12 may be substantially straight, with first and second cutting portions 18, 20 being aligned along major axis 9 of blade 12.

In the embodiment illustrated in FIGS. 1-3, blade 12 is formed substantially along a plane "A". However, Applicant contemplates that other configurations for blade 12 may be useful in various applications. For example, first and second cutting portions 18, 20 may be axially offset from one another along rotational axis $D_1$ of blade 12. Moreover, first and second portions 18, 20 may be radially aligned with one another and/or may be angled out of parallel alignment with plane "A".

Cutting blade apparatus 10 may further include a sleeve 11 circumaxially disposed about a portion of blade 12. In some embodiments, sleeve 11 may be a reinforcing body for reinforcing at least a portion of blade 12 adjacent to aperture 16, wherein blade 12 is reinforced and insulated from damage attributable to forces focused adjacent to aperture 16. A weakening of blade 12 is created by the introduction of aperture 16 therethrough, which aperture 16 may be a focal point for damage, such as bends, cracks, and the like created through moment forces on blade 12. Significant such moment forces may be generated in the event of impacts between an operating blade 12 and, for example, a fixed object.

Sleeve 11 may be fabricated from a variety of materials, such as carbon steel, powder coated carbon steel, nickel steel, polymeric materials, and the like. Sleeve 11 may partially or completely encompass a portion of blade 12, and may be positioned along blade 12 at or adjacent to a center portion thereof. Sleeve 11 may be, prior to press fitting upon blade 12, a 1.0625 inch outside diameter steel tube having a length of about 3-4 inches, with the wall thickness of sleeve 11 being appropriate to enable positioning of sleeve 11 at least partially about blade 12. As illustrated in FIGS. 1-2, aperture+ 16 may extend through both blade 12 and sleeve 11. In one embodiment, sleeve 11 is press-fit upon blade 12 so as to frictionally engage therewith and/or thereabout. Sleeve 11 may be press fit upon blade 12 such that a height dimension of cutting blade apparatus 10 at sleeve 11 is substantially equal to height dimension "H" of the remainder of blade 12. In such an arrangement, upper and lower portions 25, 27 of blade 12 coextensive with sleeve 11 may be compressed substantially into contact with one another. Other arrangements and embodiments of sleeve 11, however, are contemplated by the present invention.

As illustrated in the cross-sectional view of FIG. 3, cutting blade apparatus 10 may include reinforcing pins 19 extending between respective portions of blade 12. In the illustrated embodiment, reinforcing pins 19 extend from an upper portion 25 to a lower portion 27 of blade 12. Reinforcing pins 19 may be secured to respective portions of blade 12 through various securement mechanisms. In one embodiment, reinforcing pins 19 are welded to upper and lower portions 25, 27 of blade 12. In this manner, reinforcing pins 19 assist in maintaining a desired configuration for blade 12, and particularly in the event of substantial impact forces placed upon blade 12. To aid in reinforcing blade 12, reinforcing pins 19 may be fabricated from a relatively strong material, such as various metals and/or polymeric materials. In one particular example, reinforcing pins 19 inhibit the deformation of blade 12, and particularly slot 28 in the event of an impact between an operating blade 12 and, for example, a fixed object. Through such reinforcement, reinforcing pins 19 assist in inhibiting deformation of slot 28, and the resultant risk of displacement or ejection of cutting edge components 14 from engagement with blade 12.

In some embodiments, reinforcing pins 19 may be positioned at or near cutting portions 18, 20 of blade 12 to most effectively protect against undesired deformation of slot 28. While reinforcing pins 19 are illustrated in connection with a substantially tubular portion of blade 12, it is contemplated that such reinforcing pins 19 may, for example, bridge respective portions of blade 12 framing slot 28. Accordingly, reinforcing pins 19 may be positioned in any desired orientation, and may assume a variety of configurations in order to accomplish the reinforcing characteristics described above. In one embodiment, reinforcing pins 19 may be steel cylinders having a diameter of about 0.188 inches, with opposed ends of the reinforcing pins being welded in place from upper portion 25 to lower portion 27 of blade 12.

As shown in greater detail in the enlarged view of FIG. 4, slot 28 is defined by an opening in the wall of blade 12 at first side 22. In one embodiment, slot 28 may include an access portion 30 and a retention portion 32, wherein access portion 30 has a wider opening dimension $b_1$ than retention portion opening dimension $b_2$. The relatively larger opening dimension $b_1$ is provided for the operable receipt of a portion of replaceable cutting edge component 14, which is described in greater detail hereinbelow. Such cutting edge component portion may then be retained within open area 13 of blade 12 as a result of the relatively smaller opening dimension $b_2$ of retention portion 32. In one embodiment, opening dimension $b_1$ may be between about 0.1 and about 0.5 inches, while opening dimension $b_2$ may be between about 0.05 and about 0.25 inches. Moreover, overall length of slot 28, "$L_1$", may be between about 1 and about 12 inches, while the length of access portion 30, "$L_2$", may be between about 0.5 and about 3 inches, and the length of retention portion 32, "$L_3$", may be between about 0.5 and about 9 inches. It is to be understood that slot 28 may be provided in a variety of configurations and dimensions, with a primary purpose of slot 28 being to receive and removably retain cutting edge component 14 in engagement with cutting portions 18, 20 of blade 12. Accordingly, it is to be understood that slot 28, as shown in the illustrated embodiments, is merely an exemplary arrangement.

An isolation view of a cutting edge component 14 is shown FIGS. 5-7, wherein cutting edge component 14 includes a first portion 40 having a first sharpened cutting edge 15, and a second portion 42. As best illustrated in the side elevation view of FIG. 7, second portion 42 of cutting edge component 14 is preferably configured for engagement with inner surface 21 of blade 12 so as to operably retain cutting edge component 14 in engagement with blade 12. In one embodiment, bearing surface 44 of second portion 42 may be arranged to operably contact inner surface 21 of blade 12 in the cutting edge component retention function. Second portion 42 of cutting edge component 14, however, may be provided in a variety of configurations, with the sole requirement being that second portion 42 be configured to cooperate with slot 28 and blade 12 to removably retain cutting edge component 14 at blade 12.

An operating engagement relationship between cutting edge component 14 and blade 12 is illustrated in FIG. 8. In some embodiments, second portion 42 of cutting edge component 14 may extend only partially along a length dimension of cutting edge component 14, wherein cutting edge component 14 may have a length substantially equal to overall length "$L_1$" of slot 28. In the top view of FIG. 6, second portion 42 is shown as being shorter than the overall length of cutting edge component 14 by a dimension "$L_4$". Length dimension "$L_4$" may be substantially equal to length dimension "$L_5$" illustrated in FIG. 4, such that cutting edge 15 extends to a coplanar relationship with outer edge 23 of blade 12. Slot 28 may not extend completely to edge 23 so that cutting edge component 14 is held in place against bearing edge 26 while blade 12 is in operation.

Cutting edge component 14 may further include a recess or aperture 52 which may operably coordinate with a tool, such as removal tool 60 illustrated in FIG. 9, to selectively remove cutting edge component 14 out from engagement with blade 12. For example, attachment end 62 may be sized and configured to be operably insertable into recess or aperture 52 so that force applied to handle 64 of tool 60 may be transmitted to cutting edge component 14. In one embodiment, cutting edge component 14 may be disengaged from slot 28 of blade 12 by pulling cutting edge component 14 along direction "Y" to thereby slide cutting edge component 14 along slot 28, and ultimately out therefrom.

Cutting edge component 14 may be fabricated from a variety of materials which are sufficiently strong to operably cut the target material. In one application, the target material may be vegetation, including grass, which is to be cut by a rotary mower blade. In one embodiment, cutting edge component 14 may be fabricated from a polymeric material such as ultra high molecular weight (UHMW) polyethylene. Other materials, such as polypropylene, nylon, or polyamide may also be useful in the fabrication of cutting edge component 14. An example useful material is a polyamide resin available from DuPont Engineering Polymers under the tradename Zytel® ST801A NC010A. Applicant has found that such a polyamide material provides a durable cutting edge component 14.

An advantage of the use of a polymeric material in the construction of cutting edge component 14 is that such component may be manufactured at relatively low cost, and may therefore be relatively inexpensive to the end user. The polymeric material of cutting edge component 14 may also be recyclable. Such low cost and recyclability facilitates the disposable aspect of the replaceable cutting edge components of the present invention.

A further embodiment of a replaceable cutting edge component of the present invention is illustrated in the side cross-sectional view of FIG. 10, wherein cutting edge component 114 includes a first portion 140 having a first sharpened cutting edge 115, and a second portion 142 including a second sharpened cutting edge 115'. As further illustrated in FIG. 11, first cutting edge component 114 may be configured such that second portion 142 fits within open space 13 of blade 12. In such a manner, cutting edge component 114 possesses a plurality of sharpened cutting edges 115, 115', which are selectively indexable into an operating orientation. In the embodiment illustrated in FIG. 11, first sharpened cutting edge 115 is positioned in an operating orientation for cutting the target material. In the event that first sharpened cutting edge 115 becomes damaged or dulled through use, cutting edge component 114 may be removed from slot 28 of blade 12, rotated 180° about a vertical axis, and reinstalled into slot 28, such that second portion 142 is outboard of blade 12, and second sharpened cutting edge 115' is in an operating orientation. As such, cutting edge component 114 constitutes a selectively indexable cutting edge, such that a plurality of sharpened cutting edges 115, 115' may be provided in a single cutting edge component 114 and selectively placed into an operating orientation with the remaining sharpened cutting edges positioned in a stowed orientation.

The indexable cutting edge feature of the present invention may be enabled through the at least partially hollow design of blade 12, wherein a portion of cutting edge component 114 may be operably positioned within open space 13 defined within blade 12, while first sharpened cutting edge 115 is in an operating orientation. By positioning second portion 142 of cutting edge component 114 within open space 13 of blade 12, such second portion 142, and particularly second sharpened cutting edge 115', is protected from damage which could be incurred through the use of blade 12. Although cutting edge component 114 is illustrated in FIG. 11 as having two sharpened cutting edges 115, 115', it is contemplated that various designs for cutting edge component 114 may be employed wherein more than two sharpened cutting edges are included in a single component 114.

As further illustrated in FIG. 11, blade 12 may include a second slot 72 for the selective retention of one or more accessories 80 at trailing edge 24 of blade 12. Accessory 80 is selectively engaged with second slot 72 in similar fashion as that described above with reference to cutting edge component 14 and first slot 28. Accessory 80 may comprise one or more of a variety of devices having various purposes and functionalities. For example, accessory 80 may be a mulching blade for mulching vegetation clippings cut by cutting edge component 14. Accessory 80 may additionally or instead be an "air-lift" element which operates to reduce air pressure underneath blade 12, correspondingly lifting the vegetation stems into an erect position for effective and consistent cutting thereof by cutting edge component 14. Other devices and functionalities for accessory 80 are also contemplated as being useful in connection with second slot 72 of blade 12.

As illustrated in the front elevational view of FIG. 12, accessory 80 includes a first portion 82, a second portion 84, and a bridging portion 86 connecting first and second portions 82, 84. First portion 82 may be positioned in an operating orientation while second portion 84 is disposed in open space 13 within blade 12, and removably engaged with inner surface 21 of blade 12. In the illustrated embodiment, accessory 80 may be a combination mulching blade and air-lift unit, which both mulches vegetation clippings and assists in lifting vegetation stems from the ground surface. For mulching purposes, first portion 82 of accessory 80 includes a plurality of cutting scores 88 which act to cut apart vegetation clippings imparted thereupon. In one embodiment, first edge 85 of accessory 80 may be in operable alignment with outer edge 23 of blade 12 through a relationship similar to that described above with reference to cutting edge component 14.

It is to be understood that a wide variety of accessory configurations may be utilized in cutting blade apparatus 10 of the present invention. Although second portion 84 of accessory 80 is illustrated with a configuration merely to retain accessory 80 at blade 12, it is to be understood that second portion 84 may itself comprise a functional configuration that may be selectively placed in an operating orientation outside of blade 12 in the event that the orientation of accessory 80 is reversed in a similar fashion as that described above with respect to cutting edge component 114.

A further blade embodiment of the present invention is illustrated in the cross-sectional side view of FIG. 13, wherein blade 212 includes a leading edge 222 and a trailing edge 224, and wherein leading edge 222 is part of a looped or substantially tubular portion 286 of blade 212. In this embodiment, only a portion of blade 212 forms a substantial enclosure defining open space 213, while the remainder of blade 212 may be similar to conventional cutting blades with an angled trailing edge 224. Nevertheless, a key aspect of the present invention remains with blade 212, wherein the substantially curved leading edge 222 provides a location for first slot 228 in which cutting edge component 14 may be selectively and removably engaged to blade 212. The upward presentation of leading edge 222 from plane "A'" forms an aspect of the present invention, wherein selective and removable engageability of a replacement cutting edge component is facilitated through the simple and inexpensive fabrication of an opening in such leading edge 222. Moreover, the upward extension of leading edge 222 provides protection to indexable cutting edges or accessories which may be selectively indexed into an operating orientation.

In addition to that described above, applicant contemplates that the present invention may comprise a variety of configurations which enable removable engagement of a cutting edge component with a cutting blade. For example, the illustrated embodiments depict a slot in the cutting blade with which a replaceable cutting edge component may operably engage. In other embodiments, however, the cutting blade may contain a profile defining a shape, such as a protrusion or the like, which facilitates operable engagement with a coordinating configuration of the replaceable cutting edge component. Accordingly, the present invention contemplates configurations which facilitate operable removable engagement between a cutting edge component and a cutting blade.

It is also to be understood that the cutting blade of the present invention need not have a "tubular" or "hollow" configuration, with the only requirement for the cutting blade being that it is capable of operably coupling to a replaceable cutting edge component. One attribute of the cutting blades of the present invention may comprise a leading edge having a leading surface and a trailing surface, wherein a replaceable cutting edge component may be engaged with the cutting blade through the leading edge. In such an embodiment, a portion of the cutting edge component may be retained adjacent to, or in contact with, the trailing surface of the leading edge in an orientation to facilitate operable cutting by the cutting edge component.

Blade 212 may be fabricated from materials similar to that described above with respect to blade 12. Moreover, blade 212 may have a wall thickness dimension similar to that described above with respect to blade 12.

Figure 14:
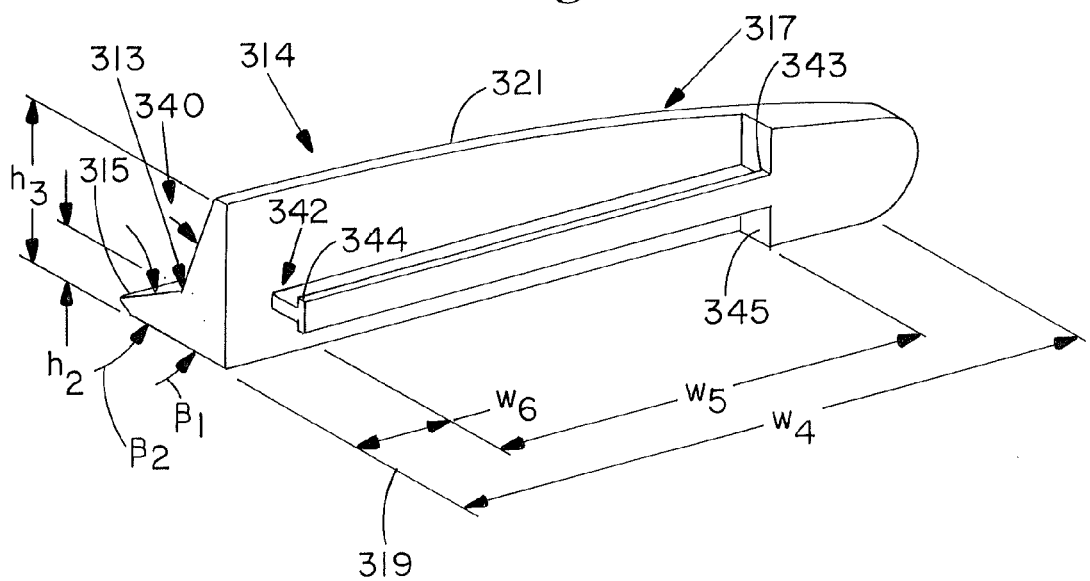
FIG. 14 is a rear perspective view of a cutting edge component of the cutting blade apparatus of the present invention.

A further cutting edge component 314 is illustrated in FIG. 14, which cutting edge component 314 includes a first portion 340 having a cutting portion 316 with a first sharpened cutting edge 315 and a lift portion 317 inclined sharply upwardly from a horizontal plane of travel 319. Cutting edge component 314 may be coupled to, for example, blade 12. In some embodiments, lift portion 317 is integrally formed with cutting portion 316 of first portion 340, with lift portion 317 meeting cutting portion 316 at an intersection zone 313. In a particular example, cutting edge component 314 is a monolithic molded article having cutting portion 316 and lift portion 317 integrally formed with one another in the molding process.

Lift portion 317, while in motion along a path substantially parallel to a ground surface, acts to create an upwardly-directed "lifting" force below blade 12, thereby causing vegetation upon the ground surface and below blade 12 to stand in an upward orientation. Consistent cutting of the grass is thereby facilitated. Unlike conventional rotary mower blades, lift portion 317 is located adjacent to cutting edge 315, thereby creating a lifting force to the vegetation at a location proximate to cutting edge 315. In such a manner, lifting and cutting of the vegetation may be accomplished in a single pass of blade 12, whereas conventional blades having an upwardly-angled profile at the trailing edge of the blade require a first "lifting" pass of the blade, and a second "cutting" pass of the blade.

Lift portion 317 may take on a variety of suitable profiles and dimensions. By way of example, a height of lift portion, as defined by dimension "$h_1$", may typically be between 5 and about 50 mm, and in one embodiment about 15 mm, and a width dimension "$w_1$" may be between about 1 and about 20 mm. Front face 321 of lift portion 317 may be disposed at one or more angles $\beta_1$ between about 20° and about 90°, and more typically between about 50° and 80° with respect to horizontal plane 319. In the illustrated embodiment, first portion 340 includes a cutting portion 316 having a height dimension "$h_2$" of between about 5 and 20 mm, and in one embodiment, about 10 mm, and a width dimension "$w_2$" of between about 5 and 20 mm, and in one embodiment about 12 mm. Front face 323 of cutting portion 316 may be disposed at one or more angles $\beta_2$ of between about 5° and about 50°, and typically between about 10° and 30° with respect to horizontal plane 19. In many embodiments, angle $\beta_2$ is less than angle $\beta_1$ by at least about 10°. In all, first portion 340 of cutting edge component 314 may, in some embodiments, have a height dimension "$h_3$" of between about 10 and 91 mm, and a width dimension "$w_3$" of between about 6 and 40 mm.

Cutting edge component 314 further includes a second portion 342 enabling coupling of cutting edge component 314 to blade 12, in similar fashion as that described above with respect to cutting edge components 14, 114. In some embodiments, second portion 342 of cutting edge component 314 may include a safety stop 345 disposed at a proximal end 343 of second portion 342. Safety stop 345 is preferably configured to operably engage first side 22 of blade 12 adjacent slot 28. Such engagement operably arrests operable relative movement between cutting edge component 314 and blade 12 along a direction toward outer edge 23 of blade 12. In such a manner, further assurance is provided that cutting edge component 314 will not radially dislodge from blade 12 during operation.

In some embodiments, cutting edge component 314 has an overall width dimension "$w_4$" of between about 20 and 250 mm. Second portion 342 may have a width dimension "$w_5$" of between about 10 and 150 mm, with a width dimension "$w_6$" between a distal end 344 of second portion 342 and distal end 318 of cutting edge component 314 being between about 1 and 20 mm.

Figure 15:
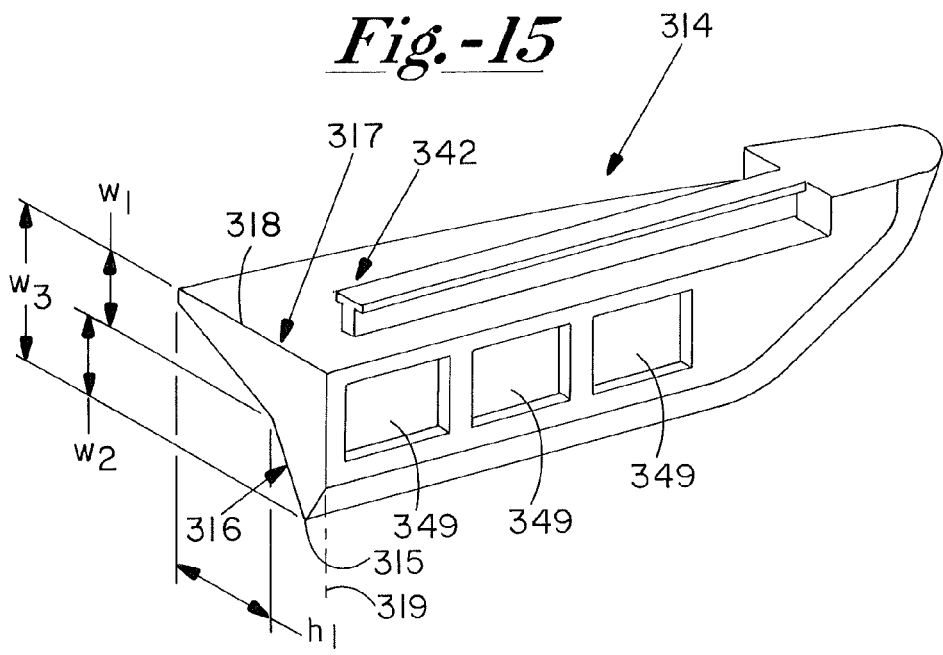
FIG. 15 is a bottom perspective view of the cutting edge component illustrated in FIG. 14.

A further aspect of the present invention includes optionally hollowing out the cutting edge component, such as cutting edge component 314. As illustrated in FIG. 15, first portion 340 of cutting edge component 314 is hollowed out at apertures 349. Such hollowing, however, is done only to an extent at which cutting edge component 314 remains sufficiently strong and durable to desirably perform. The hollowing of cutting edge component 314 may reduce overall mass of cutting edge 314, thereby saving on material use, as well as potentially enabling increased rotational speeds of blade 12 through decreased weight placed at distal ends thereof.

FIGS. 16-19 illustrate a further embodiment of the present invention, namely cutting edge component 414, which includes a plurality of cutting scores 488 in combination with lift portion 417. In this arrangement, cutting edge component 414 may be a combination mulching blade and air-lift utility, which both mulches vegetation clippings and assists in lifting vegetation stems from the ground surface as described above. As best illustrated in the top view of FIG. 18, cutting scores 488 are arranged in angular misalignment with a direction of travel "V" of cutting edge component 414. For example, cutting scores 488 may have respective alignment axis 491, 492, 493 which are angularly offset from direction of travel "V" by respective angles $\alpha_1, \alpha_2, \alpha_3$. In some embodiments, offset angles $\alpha_1, \alpha_2, \alpha_3$ may be between about 5° and 75°, and in some embodiments, between about 30° and 60°. Such angles of misalignment result in respective mulching edges 488 (a-f) with relatively sharp profiles for effectively mulching vegetation clippings cut by cutting edge 415. In this manner, cutting edge component 414 provides the "lift" advantages described above with respect to cutting edge component 314, while also providing mulching characteristics.

Cutting scores 488 may be provided in a variety of configurations and profiles, with the primary goal being to present relatively sharp edges to vegetation clippings cut by cutting edge 415. In one embodiment, cutting scores 488 are substantially u-shaped openings in lift portion 417, wherein each cutting score 488 may have width dimensions "$w_a, w_b, w_c$" of between about 1 and 20 mm, and in some embodiments, between about 5 and 15 mm. Cutting scores 488 may additionally have height dimensions "$h_a, h_b, h_c$" of between about 1 and 20 mm, and, in some embodiments, between about 5 and 15 mm.

In one embodiment of the present invention, blade 12 may be fabricated from 13 gauge powder-coated carbon steel tubing having an outside diameter of 1.0 inch and a wall thickness of 0.095 inches. The steel tubing is cut to length, such as a nominal length of 22 inches. A sleeve 11 is prepared from 1.0625 outside diameter powder-coated carbon steel tubing cut to a length of about 3-4 inches. The sleeve 11 is slid onto and about the blade tubing to a center portion thereof. The combination is placed in a tube bender, which bends cutting portions 18, 20 of blade 12 to a desired extent, as described above.

The combination blade and sleeve are then placed in a press, such as a 35,000 ton press, which presses the combination blade and sleeve to a height dimension "H" of about 0.5 inches. The pressing operation secures sleeve 11 to blade 12, and substantially presses together upper and lower portions 25, 27 of blade 12 at the center portion thereof. Spindle aperture 16 at or near a center of blade 12 is then created with a drill press, along with holes for receiving reinforcing pins 19, place about 2-3 inches in from respective ends of blade 12. Solid steel reinforcing pins having an outer diameter of 0.18 inches and a length of 0.5 inches are placed in the holes to span first and second portions 25, 27 of blade 12, and the pins are then tack welded in place on both sides of blade 12.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different methods/devices and that various modifications can be accomplished without departing from the scope of the invention itself.

What is claimed is:

1. A cutting blade apparatus for use in a rotary mower for cutting along a cutting plane, comprising:
   (a) a blade including a front surface operably leading said blade along the cutting plane, and an opposed rear surface, and a central portion interposed between first and second distal end portions, with each of said distal end portions defining a respective distal end of said blade, wherein said first distal end portion of said blade includes a tubular portion having a leading edge with a leading surface and a trailing surface, and a slot providing an opening from said leading surface to said trailing surface, said slot being spaced from said first distal end to define a bearing edge displaced inwardly from said first distal end of said blade at a distal end of said slot, said blade including a first plane parallel to the cutting plane and bisecting each of said central portion and said first and second distal end portions to define opposed upper and lower portions of said blade, said central portion having a first longitudinal axis extending horizontally along said first plane and equidistantly between said front and rear surfaces to intersect both of said first and second distal end portions, said first distal end portion having a second longitudinal axis extending horizontally along said first plane and equidistantly between said front and rear surfaces to intersect both of said first longitudinal axis and said first distal end, said second longitudinal axis being angularly offset from said first longitudinal axis by a first offset angle, said second distal end portion having a third longitudinal axis extending horizontally along said first plane and equidistantly between said front and rear surfaces to intersect both of said first longitudinal axis and said second distal end, said third longitudinal axis being angularly offset from said first longitudinal axis by a second offset angle, wherein said first longitudinal axis passes through neither of said first and second distal ends, and said second and third longitudinal axes are substantially parallel to one another; and
   (b) a replaceable cutting edge component having a first portion including a cutting edge, and a second portion that is removeably engageable through said slot to operably retain said first portion of said cutting edge component in proximity to said leading surface of said blade and said second portion in contact with said trailing surface of said blade and said bearing edge.

2. A cutting blade apparatus as in claim 1 wherein the engagement of said second portion of said cutting edge component through said slot operably retains said first portion of said cutting edge component in contact with said leading surface of said blade.

3. A cutting blade apparatus as in claim 1 wherein said trailing surface is an inner surface of said tubular portion of said blade.

* * * * *